US011676258B1

(12) United States Patent
Harvey et al.

(10) Patent No.: US 11,676,258 B1
(45) Date of Patent: *Jun. 13, 2023

(54) METHOD AND SYSTEM FOR ASSESSING DAMAGE TO INFRASTRUCTURE

(71) Applicant: STATE FARM MUTUAL AUTOMOBILE INSURANCE COMPANY, Bloomington, IL (US)

(72) Inventors: Brian N. Harvey, Bloomington, IL (US); Nathan L. Tofte, Downs, IL (US); Roger D. Schmidgall, Normal, IL (US); Michael Jeffrey Aviles, Bloomington, IL (US); Kyle Pott, Bloomington, IL (US); Rosemarie Geier Grant, Ellsworth, IL (US); Eric Haefli, Bloomington, IL (US); Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,401

(22) Filed: Mar. 26, 2020

Related U.S. Application Data

(63) Continuation of application No. 15/966,086, filed on Apr. 30, 2018, which is a continuation of application
(Continued)

(51) Int. Cl.
*G06K 9/00* (2022.01)
*G06T 7/00* (2017.01)
(Continued)

(52) U.S. Cl.
CPC ............ *G06T 7/0004* (2013.01); *G06F 18/24* (2023.01); *G06T 7/60* (2013.01); *G06T 7/62* (2017.01);
(Continued)

(58) Field of Classification Search
None
See application file for complete search history.

(56) References Cited

U.S. PATENT DOCUMENTS 8,346,578 B1  1/2013  Hopkins, III et al.
8,380,545 B2  2/2013  Chen et al.
(Continued)

OTHER PUBLICATIONS

Carunnio et al., "EDCAR: a knowledge representation framework to enhance automatic video surveillance" (Year: 2019).*
(Continued)

*Primary Examiner* — Soo Jin Park
(74) *Attorney, Agent, or Firm* — Marshall, Gerstein & Borun LLP

(57) ABSTRACT

A method and system may survey a property using aerial images captured from an unmanned aerial vehicle (UAV), a manned aerial vehicle (MAV) or from a satellite device. The method may include identifying a commercial property for a UAV to perform surveillance, and directing the UAV to hover over the commercial property and capture aerial images at predetermined time intervals. Furthermore, the method may include receiving the aerial images of the commercial property captured at the predetermined time intervals, detecting a surveillance event at the commercial property, generating a surveillance alert, and transmitting the surveillance alert to an electronic device associated with an owner of the commercial property.

19 Claims, 5 Drawing Sheets

Related U.S. Application Data

No. 15/718,323, filed on Sep. 28, 2017, now Pat. No. 10,007,992, which is a continuation of application No. 15/165,457, filed on May 26, 2016, now Pat. No. 9,805,456, which is a continuation of application No. 14/808,502, filed on Jul. 24, 2015, now Pat. No. 9,390,489, which is a continuation of application No. 14/510,784, filed on Oct. 9, 2014, now Pat. No. 9,129,355.

(51) Int. Cl.

| | |
|---|---|
| *G06T 7/60* | (2017.01) |
| *G06T 15/00* | (2011.01) |
| *G06T 7/62* | (2017.01) |
| *G06V 10/42* | (2022.01) |
| *G06V 10/44* | (2022.01) |
| *G06F 18/24* | (2023.01) |

(52) U.S. Cl.
CPC ............ *G06T 15/005* (2013.01); *G06V 10/42* (2022.01); *G06V 10/44* (2022.01); *G06T 2200/04* (2013.01); *G06T 2207/10032* (2013.01); *G06T 2207/30108* (2013.01)

(56) References Cited

U.S. PATENT DOCUMENTS

| | | | |
|---|---|---|---|
| 8,756,085 | B1 | 6/2014 | Plummer et al. |
| 8,818,572 | B1 | 8/2014 | Tofte et al. |
| 8,872,818 | B2 | 10/2014 | Freeman et al. |
| 8,874,454 | B2 | 10/2014 | Plummer et al. |
| 9,129,355 | B1 | 9/2015 | Harvey et al. |
| 9,390,489 | B1 | 7/2016 | Harvey et al. |
| 9,805,456 | B1 | 10/2017 | Harvey et al. |
| 10,102,584 | B1 * | 10/2018 | Devereaux ............. G06Q 10/20 |
| 10,311,302 | B2 | 6/2019 | Kottenstette et al. |
| 10,366,288 | B1 | 7/2019 | Kottenstette et al. |
| 10,643,072 | B2 | 5/2020 | Kottenstette et al. |
| 11,151,378 | B2 | 10/2021 | Kottenstette et al. |
| 11,210,552 | B2 | 12/2021 | Kossyk et al. |
| 11,222,426 | B2 | 1/2022 | Richter et al. |
| 11,232,150 | B2 | 1/2022 | Vianello et al. |
| 11,367,265 | B2 | 6/2022 | Vianello et al. |
| 2006/0271695 | A1 * | 11/2006 | Lavian .................. G06F 21/552 709/229 |
| 2007/0070185 | A1 | 3/2007 | Dy et al. |
| 2007/0260401 | A1 | 11/2007 | Sydor et al. |
| 2008/0144884 | A1 * | 6/2008 | Habibi ............. G08B 13/19689 382/103 |
| 2009/0265193 | A1 * | 10/2009 | Collins ............. G06Q 30/0185 705/4 |
| 2012/0033851 | A1 | 2/2012 | Chen et al. |
| 2013/0211790 | A1 * | 8/2013 | Loveland ........... G06K 9/00637 703/1 |
| 2014/0019166 | A1 | 1/2014 | Swanson et al. |
| 2014/0100889 | A1 | 4/2014 | Tofte |
| 2014/0259549 | A1 | 9/2014 | Freeman et al. |
| 2014/0270492 | A1 | 9/2014 | Christopulos et al. |
| 2014/0278573 | A1 | 9/2014 | Cook |
| 2014/0278587 | A1 | 9/2014 | Plummer et al. |
| 2014/0320651 | A1 | 10/2014 | Mcclatchie et al. |
| 2014/0324483 | A1 | 10/2014 | Plummer et al. |
| 2014/0334689 | A1 | 11/2014 | Butler et al. |

OTHER PUBLICATIONS

Hongeng et al., "Video-based event recognition: activity representation and probabilistic recognition methods" (Year: 2004).*

U.S. Appl. No. 14/510,307 entitled "Method and System for Determining the Condition of Insured Properties in a Neighborhood," filed Oct. 9, 2014.

U.S. Appl. No. 14/510,492 entitled "Method and System for Assessing Damage to Insured Properties in a Neighborhood," filed Oct. 9, 2014.

U.S. Appl. No. 14/510,536 entitled "Method and System for Generating Real-Time Images of Customer Homes During a Catastrophe," filed Oct. 9, 2014.

Office Action issued in U.S. Appl. No. 14/510,307 dated Dec. 18, 2014.

Office Action issued in U.S. Appl. No. 14/510,492 dated Jan. 8, 2015.

Office Action issued in U.S. Appl. No. 14/510,536 dated Dec. 23, 2015.

Office Action issued in U.S. Appl. No. 14/510,307 dated Jun. 24, 2015.

U.S. Appl. No. 14/510,784 entitled "Method and System for Assessing Damage to Infrastructure," filed Oct. 9, 2014.

Samadzadegan et al., "Earthquake destruction assessment of urban road network using satellite imagery and fuzzy interference systems," Proc. The International Archives of the Photogrammetry, Remote Sensing and Spatial Information Sciences, 2008, pp. 409-414.

Atkins et al., "An Integrated damage, visual, and radar analysis of the 2013 Moore Oklahoma EF5 tornado," American Meteorological Society, Jul. 2014.

Li et al., "Study on road damage assessment based on RS and GIS," IGARSS 2010.

Yamazaki, "Applications of remote sensing and GIS for damage assessment," In: ICUS/Incede Report 1, Joint Workshop on Urban Safety Engineering, Bangkok, 2001.

Office Action issued in U.S. Appl. No. 14/510,784 dated Nov. 25, 2014.

Office Action issued in U.S. Appl. No. 14/510,536 dated Jul. 6, 2015.

Office Action issued in U.S. Appl. No. 14/510,492 dated Jul. 15, 2015.

Office Action issued in U.S. Appl. No. 14/510,307 dated Nov. 19, 2015.

Office Action issued in U.S. Appl. No. 14/510,536 dated Nov. 27, 2015.

Office Action issued in U.S. Appl. No. 14/510,307 dated May 20, 2016.

Office Action issued in U.S. Appl. No. 14/510,536 dated May 25, 2016.

Office Action issued in U.S. Appl. No. 14/510,307 dated Jun. 26, 2017.

Office Action issued in U.S. Appl. No. 14/510,492 dated Jul. 12, 2016.

Office Action issued in U.S. Appl. No. 14/510,492 dated Feb. 2, 2016.

Office Action issued in U.S. Appl. No. 14/510,536 dated Jun. 27, 2017.

U.S. Appl. No. 15/837,649, filed Dec. 11, 2017.

Office Action issued in U.S. Appl. No. 14/510,492 dated Jan. 18, 2018.

* cited by examiner

METHOD AND SYSTEM FOR ASSESSING DAMAGE TO INFRASTRUCTURE

RELATED APPLICATIONS

This application is a continuation of and claims priority to U.S. application Ser. No. 15/966,086 filed on Apr. 30, 2018, entitled "Method and System For Assessing Damage To Infrastructure," which is a continuation of and claims priority to U.S. application Ser. No. 15/718,323 filed on Sep. 28, 2017, entitled "Method and System For Assessing Damage To Infrastructure," which is a continuation of and claims priority to U.S. application Ser. No. 15/165,457 filed on May 26, 2016, entitled "Method and System For Assessing Damage To Infrastructure," which is a continuation of and claims priority to U.S. application Ser. No. 14/808,502 filed on Jul. 24, 2015, entitled "Method and System For Assessing Damage To Infrastructure," which is a continuation of and claims priority to U.S. application Ser. No. 14/510,784, filed on Oct. 9, 2014, entitled "Method and System For Assessing Damage To Infrastructure," the entire disclosures of each of which are hereby expressly incorporated by reference.

TECHNICAL FIELD

The present disclosure generally relates to a method and system for assessing damage to infrastructure such as roads, highways, bridges, etc.

BACKGROUND

Infrastructure such as roads, highways, bridges, etc., often becomes damaged over time due to wear and tear, natural disasters, extreme weather conditions, etc. To perform regular maintenance on the infrastructure, personnel may need to travel to the site to determine how to repair or replace the damaged infrastructure.

Often, the investigations can be time-consuming, difficult and even dangerous for the on-site personnel. For example, in order to investigate the damage to a highway, an inspector may have to travel to the highway and inspect the condition of the road. While a lane or section of the highway may be blocked off to prevent vehicles from passing by during the inspection, some vehicles may accidentally cross these barriers and crash into the inspectors performing the investigation, resulting in injuries or even death.

Even if the inspectors perform the investigation without getting injured, performing the full investigation may still be time-consuming. In addition to the time required to drive to and from the site and to perform the inspection itself, significant paperwork and calculations may be involved in calculating the cost of repairing the item of infrastructure. For example, if an inspector takes photos on the site to assess the amount of damage to the highway, the inspector may have to come back to her office, research the cost of the damaged infrastructure item and research repair costs. All of these steps are time consuming and both delay repairs and prevent the inspector from assessing damage to other items of infrastructure.

SUMMARY

To assess the extent or severity of the damage to infrastructure, an automated infrastructure evaluation system may identify an item of infrastructure for assessing damage. For example, a bridge, a road, a highway, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, a public transportation system, etc., may be identified. The infrastructure evaluation system may also determine boundaries for assessing the damage to the item of infrastructure. For example, if a stretch of Highway 80 from exit 220 to exit 225 is to be evaluated, the system may identify a set of boundaries (e.g., global positioning system (GPS) coordinates) which encapsulates the area between exit 220 and exit 225 on Highway 80.

Using the identified boundaries, the system may perform an automatic inspection of the infrastructure item. The automatic inspection may be performed by an unmanned aerial vehicle (UAV), or by a swarm of UAVs working together, which may be controlled by an inspector or by the system and flown within the specified boundaries to capture aerial images of the item. Alternatively, the automatic inspection may be performed by a satellite which also captures aerial images of the infrastructure item for the specified boundaries. Moreover, the inspection may also be performed by a manned aerial vehicle (MAV) which captures aerial images of the infrastructure item. Each captured aerial image may be associated with a location, for example a GPS location, and the GPS location may be used to aggregate the aerial images to form a 3-dimensional (3D) image.

The aerial images may also be analyzed to determine the condition of the infrastructure item as well as the extent or severity of the damage to the infrastructure item. Moreover, the system may assign an indicator (e.g., a color from a set of colors), which indicates the extent of the damage to the infrastructure item or to a specific portion of the infrastructure item. The system may also display the assigned indicator along with the infrastructure item on a computing device for a user, such as the inspector, to observe. In this manner, the damage assessment for infrastructure can be performed automatically, without requiring an inspector to spend her time and risk injury investigating the damage. Moreover, the system provides indicators to allow an inspector to quickly and easily view areas where the damage is most severe in order to determine costs and the necessary repairs for the severely damaged areas.

In an embodiment, a method for surveying a property using an unmanned aerial vehicle (UAV) is provided. The method includes identifying a commercial property for a UAV to perform surveillance, and directing the UAV to hover over the commercial property and capture aerial images at predetermined time intervals. Furthermore, the method includes receiving the aerial images of the commercial property captured at the predetermined time intervals, detecting a surveillance event at the commercial property, generating a surveillance alert, and transmitting the surveillance alert to an electronic device associated with an owner of the commercial property.

In another embodiment, a system for surveying a property using an unmanned aerial vehicle (UAV) is provided. The system includes one or more processors, a communication network, and a non-transitory computer-readable memory coupled to the one or more processors, and the communication network, and storing instructions thereon. When executed by the one or more processors, the instructions cause the system to identify a commercial property for a UAV to perform surveillance, and direct the UAV to hover over the commercial property and capture aerial images at predetermined time intervals. The instructions further cause the system to receive the aerial images of the commercial property captured at the predetermined time intervals, detect a surveillance event at the commercial property, generate a surveillance alert, and transmit the surveillance alert to an electronic device associated with an owner of the commercial property.

In yet another embodiment, a non-transitory computer-readable memory coupled to one or more processors and storing instructions thereon is provided. When executed by the one or more processors, the instructions cause the one or more processors to identify a commercial property for a UAV to perform surveillance, and direct the UAV to hover over the commercial property and capture aerial images at predetermined time intervals. The instructions further cause the one or more processors to receive the aerial images of the commercial property captured at the predetermined time intervals, detect a surveillance event at the commercial property, generate a surveillance alert, and transmit the surveillance alert to an electronic device associated with an owner of the commercial property.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1A:
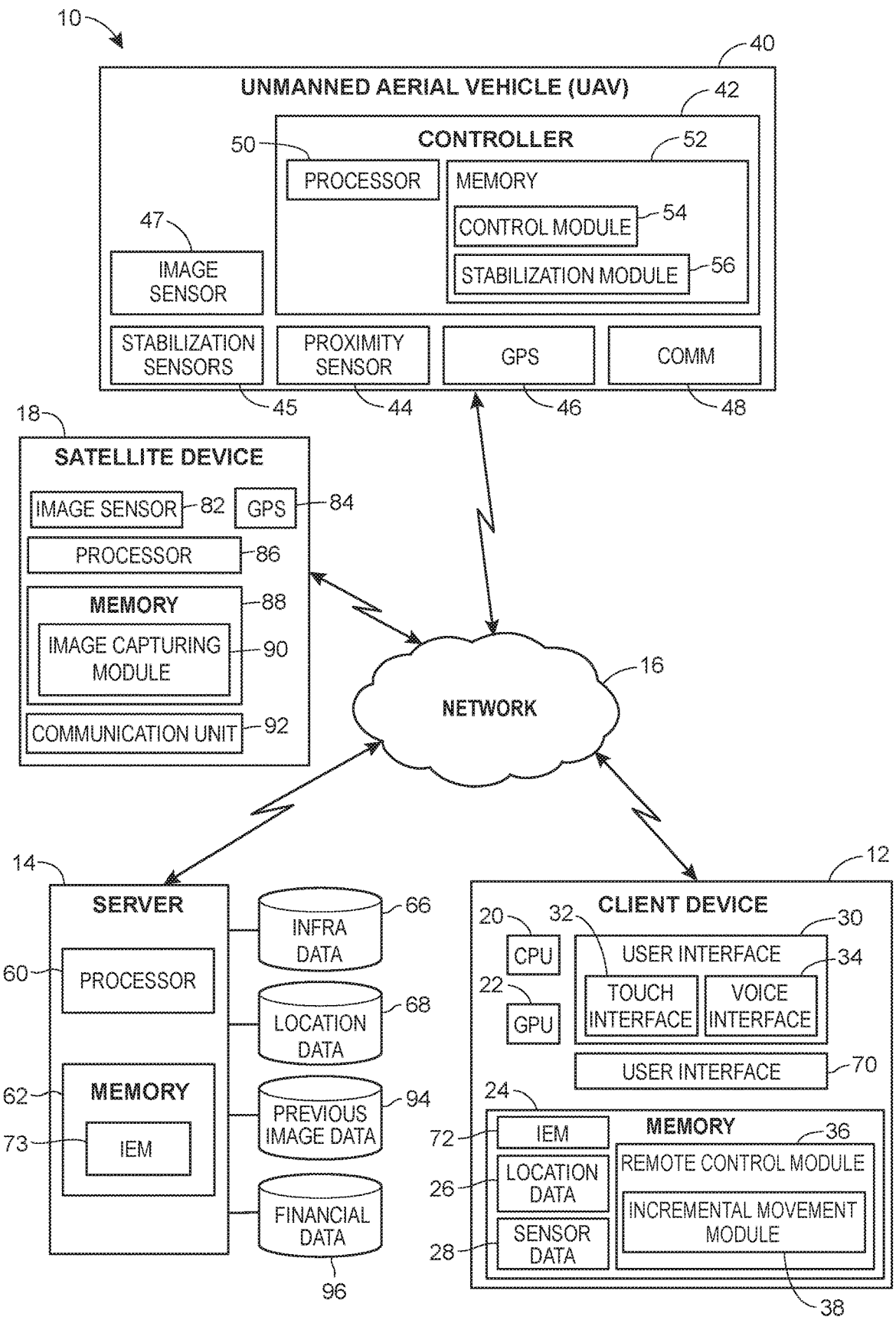
FIG. 1A illustrates a block diagram of an example system in which techniques for performing an automatic damage assessment of an item of infrastructure are implemented.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Accordingly, the term "aerial image" as used herein, may be used to refer to any image data within the electromagnetic spectrum (i.e. including the visible light spectrum as well as the invisible light spectrum), which is captured from an elevated position. Aerial images may include visible light imaging, radar imaging, near infrared imaging, thermal infrared imaging, hyperspectral imaging, multispectral imaging, full spectral imaging, etc. For example, an image captured by a satellite, a manned aerial vehicle (MAV) or an unmanned aerial vehicle (UAV) may be referred to herein as an "aerial image." An aerial image may be made up of data points, for example pixel data points, where each data point may correspond to a specific global positioning system (GPS) location. An aerial image may also include video captured from an elevated position.

Also, the term "infrastructure item" or "item of infrastructure" as used herein, generally refers to a physical component that provides commodities and/or services essential to enable, sustain, or enhance societal living conditions. An infrastructure item may include a highway, a road, a bridge, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, a public transportation system, etc., or any portion thereof. In some embodiments, items of infrastructure may not include buildings.

Generally speaking, to perform the automatic infrastructure evaluation process, an aerial image capturing device which may be a satellite, MAV, or one or several UAV(s) is/are directed to capture images within a specified set of boundaries which encapsulates an identified item of infrastructure (e.g., a highway segment between exit 10 and exit 20). The aerial image capturing device may be directed by a client device having user controls for determining the location and the amount of photographs or video captured. The captured aerial images may then be provided to the client device or to a server computer. The aerial images may be aggregated, for example using photogrammetry, stereoscopy, or LIDAR, to create a 3D image of the identified item.

The 2D or 3D image may be displayed on the client device and may be created at a predefined level of detail (e.g., accurate to within ten percent) and/or may be adjustable (e.g., a user of the system may be able to "zoom in" or "zoom out" of the image). Moreover, the 2D or 3D image may be made up of data points, for example pixel data points, where each data point may correspond to a specific global positioning system (GPS) location. Each of these data points may then be compared with other images of the same type of infrastructure for determining the condition of the infrastructure item depicted by the data points. For example, an image of a bridge may be compared to an image of a perfectly intact bridge. The condition may be used to determine the severity of the damage to the item of infrastructure or to a portion of the item of infrastructure. This damage severity level may be provided to an inspector, for example, on the user interface of the client device, for determining a cost of repair and/or replacement. Alternatively, the client device or the server computer may automatically determine the cost of repair and/or replacement based on the damage severity level and/or the aerial images.

FIG. 1A illustrates various aspects of an exemplary environment implementing an automated infrastructure evaluation system 10 (also referred to herein as "the system"). The system 10 may include a client device 12 with remote control capabilities coupled to one or several unmanned aerial vehicles (UAVs) 40, an MAV, a satellite device 18, and a server 14 via a communication network 16. The client device 12 may be, for example, a laptop computer, a tablet computer, a smartphone, a wearable device, etc. In the embodiment illustrated in FIG. 1A, the client device 12 may include a central processing unit (CPU) 20, a graphics processing unit (GPU) 22, a computer-readable memory 24, and a first user interface 30 for controlling the UAV(s) 40 or the satellite device 18. The first user interface 30 may include a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc. The client device 12 may further include a second user interface 70 which may be used for viewing aerial images captured by the UAV(s) 40, MAV, or the satellite device 18. In some embodiments, the first user interface 30 and the second user interface 70 may be implemented on one user interface which includes user controls for directing the UAV(s) 40 or the satellite device 18 and displays the aerial images after the aerial images have been captured.

The memory 24 is a computer-readable non-transitory storage device that may include both persistent (e.g., a hard disk) and non-persistent (e.g., RAM) memory components, stores instructions executable on the CPU 20 and/or the GPU 22 that make up an infrastructure evaluation module (IEM) 72, a remote control module 36 and location data 26 and sensor data 28 on which the remote control module 36 operates. The remote control module 36 includes an incremental movement module 38 that allows a user to easily control the UAV(s) 40 via step-like, incremental movements in which one incremental movement is in response to one single user command.

The remote control module 36 and the infrastructure evaluation module 72 according to various implementations operate as separately executable software applications, plugins that extend the functionality of another software application such as a web browser, application programming interfaces (API) invokable by a software application, etc. The instructions that make up the remote control module 36 and the infrastructure evaluation module 72 may be compiled and executable on the CPU 20 and/or the GPU 22 directly, or not compiled and interpreted by the CPU 20 at runtime. However, FIG. 1A merely illustrates a condensed version of the client device 12, and a more detailed version of the client device 12 is described below with reference to FIG. 1B.

Referring still to FIG. 1A, each UAV 40 includes a controller 42 that communicates with one or more proximity sensors 44, one or more stabilization sensors 45, a Global Positioning System (GPS) unit 46, image sensors 47, and a communications unit 48. The image sensors 47 may include one or more filters for infrared imaging, hyperspectral imaging, multispectral imaging, full spectral imaging, etc., or alternatively, the image sensors 47 may include one or more sensors which receive image data outside of the visible light spectrum such as an infrared image sensor. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating to avionics) to implement a control function, such as that associated with a control routine that performs PID (proportional-integral-derivative), fuzzy logic, nonlinear, etc. control to maintain the stability of the UAV(s) 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the remote aerial device 40 in a hover or stationary three dimensional position.

The control module 54 may retrieve data from the proximity sensors 44. These proximity sensors 44 may include any sensor or technique that assists the control module 44 in determining a distance and a direction to the infrastructure. The one or more proximity sensors 44 may include optic flow sensors, ultrasonic sensors, infrared sensors, LIDAR (Light Detection and Ranging), a stereo vision system (SVS) that may utilize the image sensors 47 (e.g., one or more cameras) to implement stereoscopic imaging techniques to capture aerial images of the infrastructure item and to create 3D images of the infrastructure item. The control module 54 may also receive instructions from the client device 12 to capture aerial images at specific locations or time intervals.

The GPS unit 46 may use "Assisted GPS" (A-GPS), satellite GPS, or any other suitable global positioning protocol or system that locates the position of the UAV(s) 40. Moreover, the GPS unit 46 may also determine the position of the aerial images or of data points within the aerial images captured by the UAV(s) 40, or the GPS may be combined with the distance and direction sensors 44 to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or wi-fi hotspots. The communication unit 48 may communicate with the server 14 or the client device 12 via any suitable wireless communication protocol network, such as a wireless telephony network (e.g., GSM, CDMA, LTE, etc.), a wi-fi network (802.11 standards), a WiMAX network, a Bluetooth network, etc.

As mentioned above, the system 10 may also include a satellite device 18 which includes an image sensor 82 for capturing aerial images and a GPS unit 84 for determining the position of each image. For example, the satellite device 18 may determine GPS coordinates of the boundaries of an aerial image, and also may determine GPS coordinates of data points, such as pixel data points, of the aerial image. The satellite device 18 may also include a processor 86 which executes instructions from a computer-readable memory 88 to implement an image capturing module 90, which may capture and transmit satellite images at the request of the client device 12. For example, the client device 12 may request satellite images between specified GPS coordinates, and the image capturing module 90 may transmit satellite images within the specified coordinates. Moreover, in some embodiments the client device 12 may specify the number of satellite images for the image capturing module 90 to capture and the zoom level. The client device 12 or the server 14 and the satellite device 18 may communicate via a communication unit 92 via any suitable wireless communication protocol network, such as a wireless telephony network (e.g., GSM, CDMA, LTE, etc.), a wi-fi network (802.11 standards), a WiMAX network, a Bluetooth network, etc.

The server 14 may include infrastructure data (e.g., a list of items of infrastructure such as "Highway 80," "the Golden Gate Bridge," "the 'L' Station," etc.), location data (e.g., locations of the items of infrastructure, locations of portions of the items of infrastructure, etc.), previous image data (e.g., aerial images of items of infrastructure taken at an earlier date), and financial data (e.g., infrastructure cost estimates of property and materials similar to those that were damaged or destroyed, labor costs for repairing/replacing the infrastructure, etc.) from an infrastructure database 66, a location database 68, a previous image database 94, and a financial database 96, respectively. The server 14 then may provide the infrastructure data, the location data, the previous image data, the financial data and appropriate indications of how certain portions of the infrastructure data and the location data are linked, to the client device 12 as part of the location data 26. The client device 12 may use this location data to determine a geographic location that the UAV(s) 40 is/are initially sent to and may use the previous image data to determine a condition of an item of infrastructure as compared to its previous condition. The financial data may be used for performing cost estimates for repairing infrastructure. The infrastructure database 66, the location database 68, the previous image database 94 and the financial database 96 may be disposed within the client device 12 depending on the implementation. The server may also include a processor 60 which executes instructions from a computer-readable memory 62 to implement an infrastructure evaluation module 73, which may be the same as the infrastructure evaluation module 72 of the client device 12. In some embodiments, the infrastructure evaluation module 72 may be disposed in the client device 12, in the server 14 or in a combination of the server 14 and the client device 12.

Figure 1B:
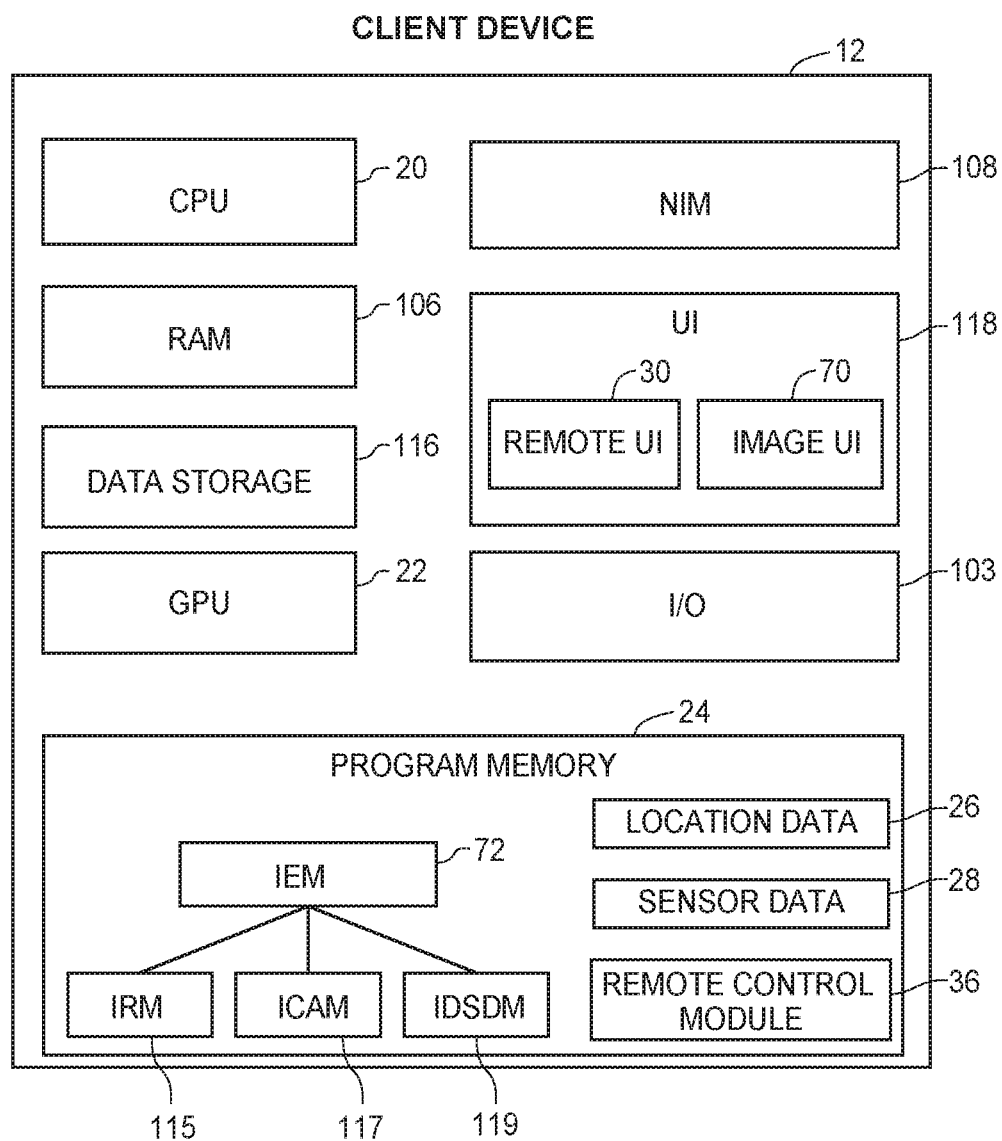
FIG. 1B illustrates a block diagram of an exemplary mobile device.

FIG. 1B illustrates the client device 12 of FIG. 1A in further detail. As illustrated in FIG. 1A, the client device may include a CPU 20, a GPU 22, and a memory 24 which may be a hard drive, an optical drive, a solid state memory device, or any other non-volatile memory device. The client device 12 may further include an input/output (I/O) unit 103 and a data storage 116, which may include infrastructure data, location data, previous image data, financial data, etc., which may be retrieved from software instructions which may be stored in the memory 24. During execution, the software instructions may be stored in, and may store and retrieve data from, a volatile or non-volatile memory source, such as a random access memory (RAM) 106. The client device 12 may include a network interface module (NIM) 108 for wired and/or wireless communications. The network interface module 108 may allow the device to communicate with one or more other devices such as the server 14, the satellite device 18, the MAV, or the UAV(s) 40 of FIG. 1A, by using one or more of any number of communications protocols including, by way of example and not limitation, Ethernet, cellular telephony, IEEE 802.11 (i.e., "Wi-Fi"), Fibre Channel, etc. The memory 24 may store an infrastructure evaluation module 72 as described above. The infrastructure evaluation module 72 may be a sub-routine of a software application or may be an independent software routine in and of itself. Alternatively, in some implementations, the infrastructure evaluation module 72 may be a hardware module or a firmware module. The infrastructure evaluation module 72 may include compiled instructions directly executable by the CPU 20, scripted instructions that are interpreted at runtime, or both.

The client device may also include a user interface (UI) 118 which includes the remote user interface 30 and the image user interface 70 of FIG. 1A. The remote user interface 30 may include user controls for directing the UAV(s) 40 to capture images, for requesting aerial images from the MAV or for requesting satellite images from the satellite device 18 at specific locations. On the other hand, the image user interface 70 may display aerial images of an infrastructure item and may also display damage severity levels for the infrastructure item.

The infrastructure evaluation module (IEM) 72 may contain one or more of an image receiving module (IRM) 115, an infrastructure condition assessment module (ICAM) 117, and/or an infrastructure damage severity determination module (IDSDM) 119. The IEM 72 may determine the severity of the damage (also referred to herein as a "damage severity level") associated with an item of infrastructure according to the presently described techniques. More specifically, the IEM 72 may automatically determine the condition of an item of infrastructure based on stored and received aerial images and/or other data describing items of infrastructure of the same type (e.g., if the item of infrastructure is a communications tower, the condition is determined based on stored images of communications towers). The aerial images may be stored in the memory 24 and/or RAM 106. In instances where the IEM 72 executes on a server device, the damage severity level for an item of infrastructure may be transmitted to the client device 12. Additionally, the IEM 72 may perform certain calculations on the server device 14 of FIG. 1A while other calculations are performed on the client device 12. Moreover, the memory 24, may also include a remote control module 36 and location data 26 and sensor data 28 on which the remote control module 36 operates as described above with reference to FIG. 1A.

Figure 2:
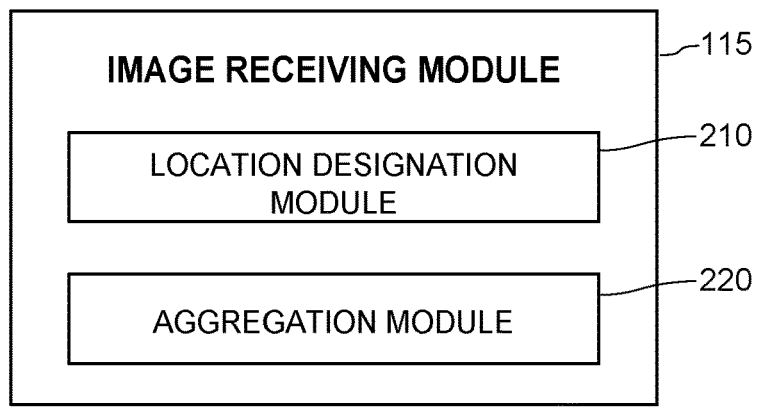
FIG. 2 illustrates a block diagram detailing an exemplary embodiment of an image receiving module.

FIG. 2 is a block diagram detailing an exemplary embodiment of the image receiving module 115 according to the present disclosure. The image receiving module 115 may include a location designation module 210, and an aggregation module 220. The location designation module 210, and the aggregation module 220 may be separate modules or may be combined and may interact with each other and/or with other software, hardware, and/or firmware.

The location designation module 210 may identify an item of infrastructure for assessing damage. To identify the item of infrastructure, the location designation module 210 may connect to a third-party server (not shown). The third-party server can include data from news sources (e.g., national news networks, regional news networks, newspapers, magazines, news websites, and others), data from weather sources (e.g., the National Oceanic and Atmospheric Administration; other federal, state, or local governmental weather bureaus; commercial weather services; weather websites; and others), data from governmental sources (e.g., the Department of the Interior, the Department of Homeland Security, other federal, state, and local governmental sources, and others), data from social networks (e.g., Facebook®, Twitter®, Google+®, Instagram®, and others), data from public databases, data from private databases (e.g., consultants, data miners, surveyors, and others), crowd sourced weather data (e.g., connected users or user devices may report extreme weather conditions to a central server) or other sources. The location designation module 210 may then use this data to determine geographic locations where damage to infrastructure is likely to have occurred, and may identify an item(s) of infrastructure within the determined geographic locations, for example, using the location database 68 of FIG. 1A. Moreover, in some embodiments the user of the client device 12 such as an inspector, may input a name of an item of infrastructure or a portion thereof such as "Golden Gate Bridge" or "Route 66 in Illinois between exit 40 and exit 102" into the client device 12 which may be provided to the location designation module 210.

In any event, when the infrastructure item is identified, the infrastructure evaluation module 72 may request and/or receive aerial images of the identified infrastructure item. For example, the infrastructure evaluation module 72 may receive the aerial images of the identified item from the satellite device 18 of FIG. 1A, the MAV, or from the UAV(s) 40. The aerial images may be received from the UAV(s) 40 by automatically directing the one or several UAV(s) 40 to fly within the set of boundaries which encapsulate the identified item. For example, the infrastructure evaluation module 72 may look up the location of the identified infrastructure item in the location database 68 to determine the appropriate set of boundaries. The UAV(s) 40 may also be directed to take several photographs or capture video at different locations surrounding the infrastructure item and at several angles. Alternatively, after the infrastructure item is identified, a user such as an inspector may control the UAV(s) 40 remotely, through a series of user controls on the remote user interface 30 to cause the UAV(s) to take pictures at different locations surrounding the infrastructure item and at several angles.

After the aerial images are captured and received for the identified infrastructure item, the infrastructure evaluation module 72 may combine the aerial images using an aggregation module 220. The aerial images may be combined to generate a 3D image of the infrastructure item using 3D imaging techniques such as LIDAR, stereoscopy, or photogrammetry. The aggregation module 220 may utilize the Cartesian or GPS coordinates received with each aerial image to reconstruct a 3D image of the infrastructure item using the aerial images captured at different locations and angles. In some embodiments, the 3D aerial image may be created at a predefined level of detail (e.g., accurate to within ten percent) and/or may be adjustable (e.g., a user or the system may be able to "zoom in" or "zoom out")

Figure 3:
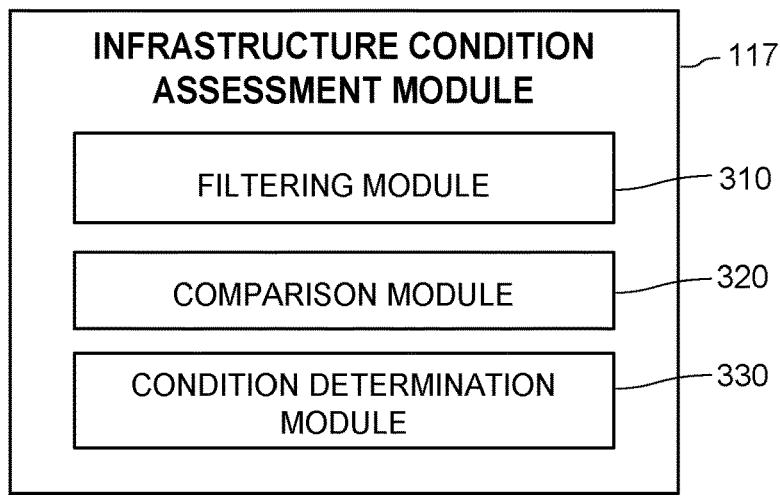
FIG. 3 depicts a block diagram detailing an exemplary embodiment of an infrastructure condition assessment module.

FIG. 3 is a block diagram detailing an exemplary embodiment of the infrastructure condition assessment module 117. The infrastructure condition assessment module 117 may include a filtering module 310, a comparison module 320 and a condition determination module 330. In some embodiments, the infrastructure condition assessment module 117 may obtain a 3D aerial image of an infrastructure item and determine the condition of the item. In other embodiments, the condition assessment module 117 does not obtain 3D aerial images and instead obtains 2D aerial images. Moreover, in some embodiments, the 3D aerial image may be obtained from the image receiving module 115.

In any event, the filtering module 310 may analyze the received aerial images and filter out (i.e., remove from consideration for further analysis) one or more irrelevant and/or unexpected data points. For example, if the damage assessment is for a road, the aerial images may include data points which display the road as well as data points where damage assessment does not need to be performed (e.g., data points depicting nearby side streets, and surrounding terrain such as grass, mountains, bodies of water, the sky, trees, etc.). The filtering module 310 may remove the unnecessary data points, so that the unnecessary data points are not included and/or considered in the damage assessment for the road. Various image processing techniques such as edge detection may be used by the filtering module 310 for determining the unnecessary data points of an aerial image(s).

Once the filtering module 310 removes the unnecessary data points from the aerial images, the remaining data points may be compared with another predefined infrastructure item using the comparison module 320. The comparison module 320 may compare the data points of the infrastructure item with data describing a predefined infrastructure item of the same type. If the infrastructure item is a bridge, for example, the comparison module 320 may compare data extracted by the filtering module 310 with previously stored images of an intact bridge. Based on these comparisons, the comparison module 320 may determine physical differences between the bridge depicted by the data points and the intact bridge. For example, the comparison module 320 may determine that the bridge differs in color (e.g., due to rusting), thickness (e.g., due to cracks or dents in the surface), and/or in shape (e.g., due to structural damage to the bridge) from the intact bridge.

Moreover, the comparison module 320 may also compare the data points depicting a bridge with a previously stored image(s) of the same bridge, for example, from five years ago when the bridge was known to be in good condition. The previously stored image(s) of the same bridge may be obtained from the previous image data 94 stored at the server 14 or the client device 12 of FIG. 1A. After an aerial image of an item of infrastructure is captured, the aerial image may be stored in the previous image data 94, so that it may be compared with a newly captured image of the same infrastructure item at a later date. In this manner, the degradation/maintenance of an infrastructure item may be determined over time for a more detailed analysis of the damage.

In addition to comparing data points, the comparison module 320 may compare a set of data points which make up a component of an infrastructure item to a previously stored image of the same component. For example, a set of data points may display a deck of a bridge, the shoulder on a highway, etc. The entire set may then be compared to data displaying, for example, a highway shoulder in good condition to determine physical differences between the set of data points and the data displaying the highway shoulder.

After comparisons have been made for the infrastructure item, a condition determination module 330 may determine the conditions of various portions of the infrastructure item. Conditions may include condition categories such as "poor," "fair," "moderate," "good," "excellent," etc., or may include numerical condition scores, for example from a scale of one to one hundred. For example, a portion of a bridge having dents and cracks may be determined to be in poor condition.

In addition to determining conditions of various portions of the infrastructure item, the condition determination module 330 may determine the size of a portion of the infrastructure item which requires repair. For example, the condition determination module 330 may determine a portion of the bridge is in "poor" condition, because it is dented. Moreover, the condition determination module 330 may determine the size of the dent based on the GPS coordinates of an aerial image depicting the bridge. This information may be used to determine the cost of repairing the dent.

Figure 4:
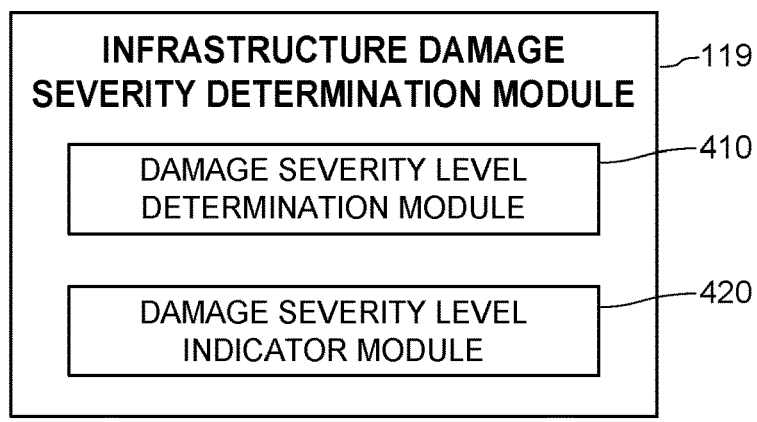
FIG. 4 depicts a block diagram detailing an exemplary embodiment of an infrastructure damage severity determination module.

Each data point along with the respective determined condition may then be provided to the infrastructure damage severity determination module 119 as depicted in FIG. 4. The infrastructure damage severity determination module 119 may include a damage severity level determination module 410, and a damage severity level indicator module 420. The damage severity level determination module 410 may determine that a data point or a set of data points belongs to a particular damage severity level category from a set of damage severity level categories. For example, the set of damage severity level categories may include "light damage," "moderate damage," "severe damage," "total loss," "no loss," "very light damage," etc. In other embodiments, the damage severity determination module 410 may determine a score for each data point, such as a numeric percentage representing the amount of damage to the portion of the infrastructure item represented by the data point. For example, the damage severity determination level module 410 may determine 100 percent damage to a bridge deck which has split in half and thus needs to be completely replaced. On the other hand, the damage severity determination level module 410 may determine 50 percent damage to a large crack or pothole in the road, which can be repaired and does not need to be replaced. In some embodiments, the damage severity level determination module 410 may determine a damage severity level category based on the numeric percentage representing the amount of damage to the portion of the infrastructure item represented by the data point. For example, the damage severity level determination module 410 may determine portions of infrastructure items having less than 20 percent damage or some other predetermined damage threshold are within the "light" category, portions of infrastructure items having between 20 and 50 percent damage are within the "moderate" category and portions of infrastructure items having more than 50 percent damage are within the "severe" category.

The damage severity level determination module 410 may determine the amount of damage based on the condition of the portion of the infrastructure item. For example, there may be a higher amount of damage determined for a bridge in poor condition than a bridge in excellent condition. The amount of damage may also be determined based on whether a portion of the infrastructure item needs to be replaced or can be repaired. Portions of infrastructure items requiring replacement may correspond to a higher amount of damage than portions of infrastructure items requiring repair. The damage severity level determination module 410 may include a set of rules for determining whether a particular portion of an infrastructure item needs to be repaired or can be replaced based on its condition. For example, suspension cables on a bridge in poor condition may need to be replaced whereas a portion of a road in the same poor condition may be repaired. The damage severity level may then be determined based on the amount of damage, as described above.

Once the damage severity level is determined for each data point or each set of data points, the damage severity level indicator module 420 may assign a damage severity level indicator to the data point or a set of data points. For example, each damage severity level category from the set of damage severity level categories may be assigned a respective damage severity level indicator. In some embodiments, the damage severity level indicator may be a color selected from a set of colors. More specifically, the "moderate" damage severity level category may correspond to the color yellow, for example. Moreover, the "severe" damage severity level category may correspond to the color red, and the "light" damage severity level category may correspond to the color green. In other embodiments, a range of damage severity level percentages may be assigned a damage severity level indicator. For example, damage severity level percentages less than 20 percent may correspond to the color green. The corresponding damage severity level indicators may then be assigned to each data point based on the determined damage severity level for the data point. For example, a set of data points representing a portion of a road with moderate damage may be assigned the color yellow. An assigned damage severity level indicator for a set of data points may then be appended to one or more aerial images which may be 3D aerial images and which display the corresponding data points. For example, an aerial image displaying the portion of the road may display the color yellow overlaying the portion of the road.

While the damage severity level indicators are described as the colors red, green and yellow, the indicators are not limited to those particular colors. Instead, the damage severity level indicators may include any color and also may include any other suitable representation of a damage severity level. For example, damage severity level indicators may include numbers which are placed over each data point or set of data points, labels, symbols, different shading techniques, etc.

The aerial images which display infrastructure items and include damage severity level indicators may then be displayed on the client device 12 for an inspector to view. In some embodiments, the client device 12 may display a 3D aerial image of an infrastructure item with damage severity level indicators overlaying the image. Moreover, in some embodiments, the client device 12 may display several aerial images for a infrastructure item and include the damage severity level indicators in each aerial image.

In some embodiments, the infrastructure evaluation module 72 may include a set of rules for determining a cost estimate based on the damage severity levels of the various portions or components of an infrastructure item. For example, the infrastructure evaluation module 72 may determine a cost estimate for repairing or replacing portions of infrastructure items based on corresponding damage severity levels. In some embodiments, the set of rules may include a table with a predetermined cost estimate for the different types of infrastructure items as well as their respective quality (e.g., bridges may be more expensive to repair than highways), size (e.g., based on square footage) and damage severity level. For example, the set of rules may include a cost estimate of $50,000 for a small road with moderate damage. The set of rules may be stored in the financial database 96. Cost estimates for each portion of an infrastructure item may be aggregated and/or combined to determine an overall cost estimate for repairing the damage to the infrastructure item. In other embodiments, an inspector or a user of the client device 12 may view the damage severity levels of the various portions or components of an infrastructure item and determine the appropriate cost estimate for repair. In addition to cost estimates, the damage severity levels may also be used to determine whether further inspection may be necessary, whether a road, highway, bridge, etc., may be closed for an extended period of time for construction/repairs, etc.

Figure 5:
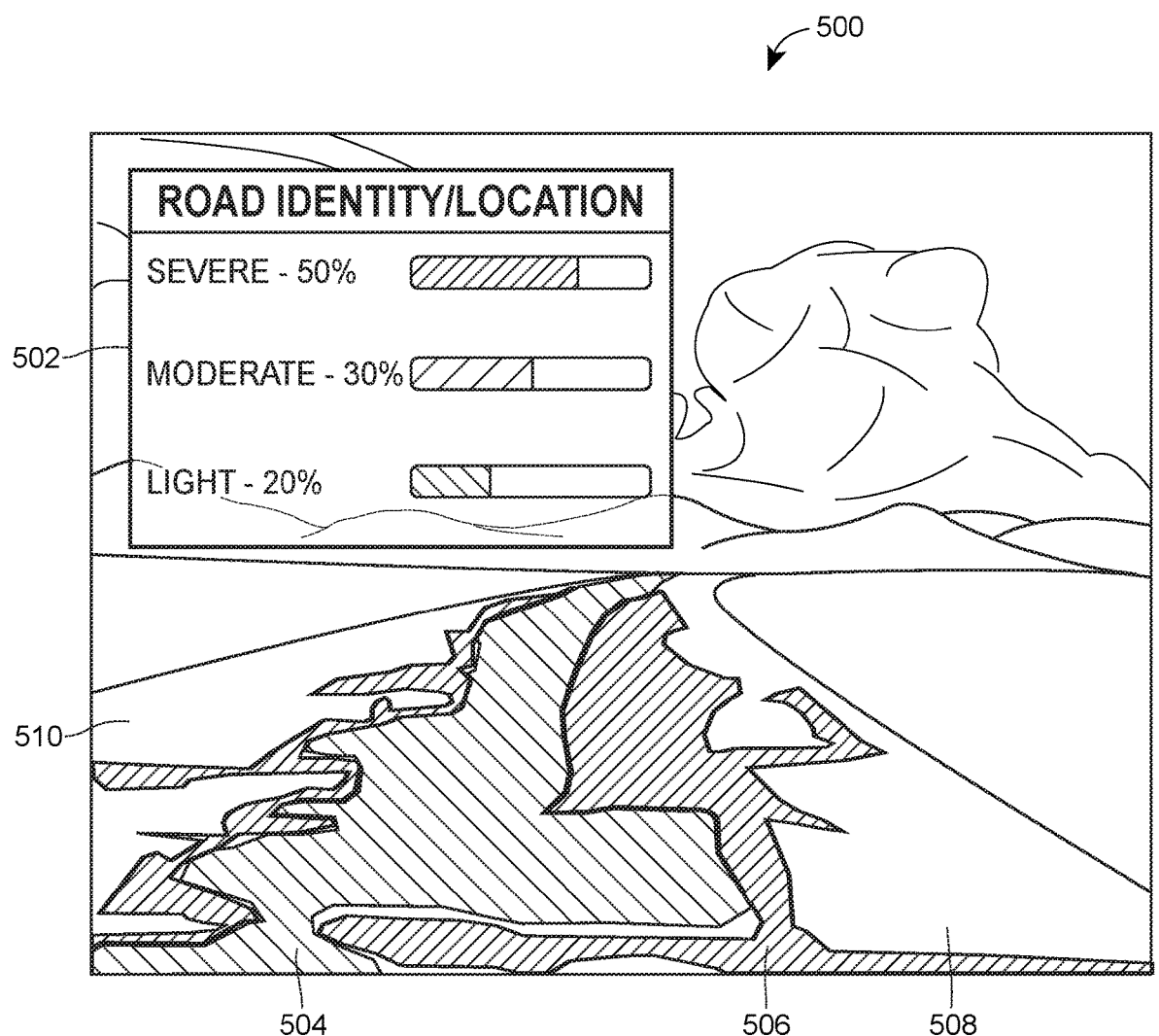
FIG. 5 depicts an exemplary display of an infrastructure item including damage severity level indicators.

FIG. 5 illustrates an exemplary display 500 of an aerial image of a road including damage severity level indicators. In some embodiments, the display 500 may be presented on the image user interface 70 of the client device 12 of FIG. 1A. In other embodiments, the display may be presented on another computing device. The display 500 may include a legend 502 which explains the meaning of each damage severity level indicator present on the display 500. For example, the legend 502 explains a red color indicates "severe" damage (50 percent damage), a yellow color indicates "moderate" damage (30 percent damage), and a green color indicates "light" damage (20 percent damage). In some embodiments, the green color may indicate less than 20 percent loss, the yellow color may indicate between 20 and 50 percent loss and the red color may indicate more than 50 percent loss.

Additionally, the display 500 may include a road 510 as well as terrain surrounding the road, such as grass, mountains, the sky, clouds, etc. Data points depicting the terrain surrounding the roads may be filtered out by the filtering module 310 of FIG. 3 during the comparison stage. On the other hand, the data points depicting the road 510 may be compared to a previously stored image of the road 510 or a road in good condition to determine conditions of portions of the road 510 and resulting damage severity levels. Based on this comparison, a first portion of the road 504 near the center has a green damage severity level indicator, indicating that the center of the road has experienced "light" damage. Surrounding the center of the road, a red damage severity level indicator overlays a second portion 506, indicating that the second portion surrounding the center has experienced "severe" damage. This may be because of large dents or potholes in the pavement. Thus, the second portion 506 may require extensive repairs, whereas the first portion may not require any repairs and instead may require further inspection at a later date. However, in some embodiments, the amount of repairs may also depend on the item of infrastructure. For example, a tunnel may require replacement when experiencing "severe" damage, while a road may require repair when experiencing the same amount of loss. Moreover, surrounding the second portion 506 is a third portion 508 of the road 510 which does not include a damage severity level indicator. The third portion 508 may not have experienced any damage and therefore may not require any repairs or further inspection.

The aerial image on the display 500 may be just one of several images of the road 510. Moreover, while the display 500 depicts a small section of the road 510 which ends at a bend, other aerial images may display additional sections taken at different angles, locations, and/or zoom levels than the display 500. The other aerial images may be combined and/or aggregated to display a larger section of the road 510 depicting several bends.

A user such as an inspector or the infrastructure evaluation module 72 may determine the amount of damage to each portion of the infrastructure item to calculate a cost estimate and combine the cost estimates for the portions to determine an overall cost estimate for repairing/replacing the infrastructure item. Moreover, the user may also determine the amount of damage to each portion to determine whether a road, highway, bridge, etc., may be closed for an extended period of time for construction/repairs, etc.

Figure 6:
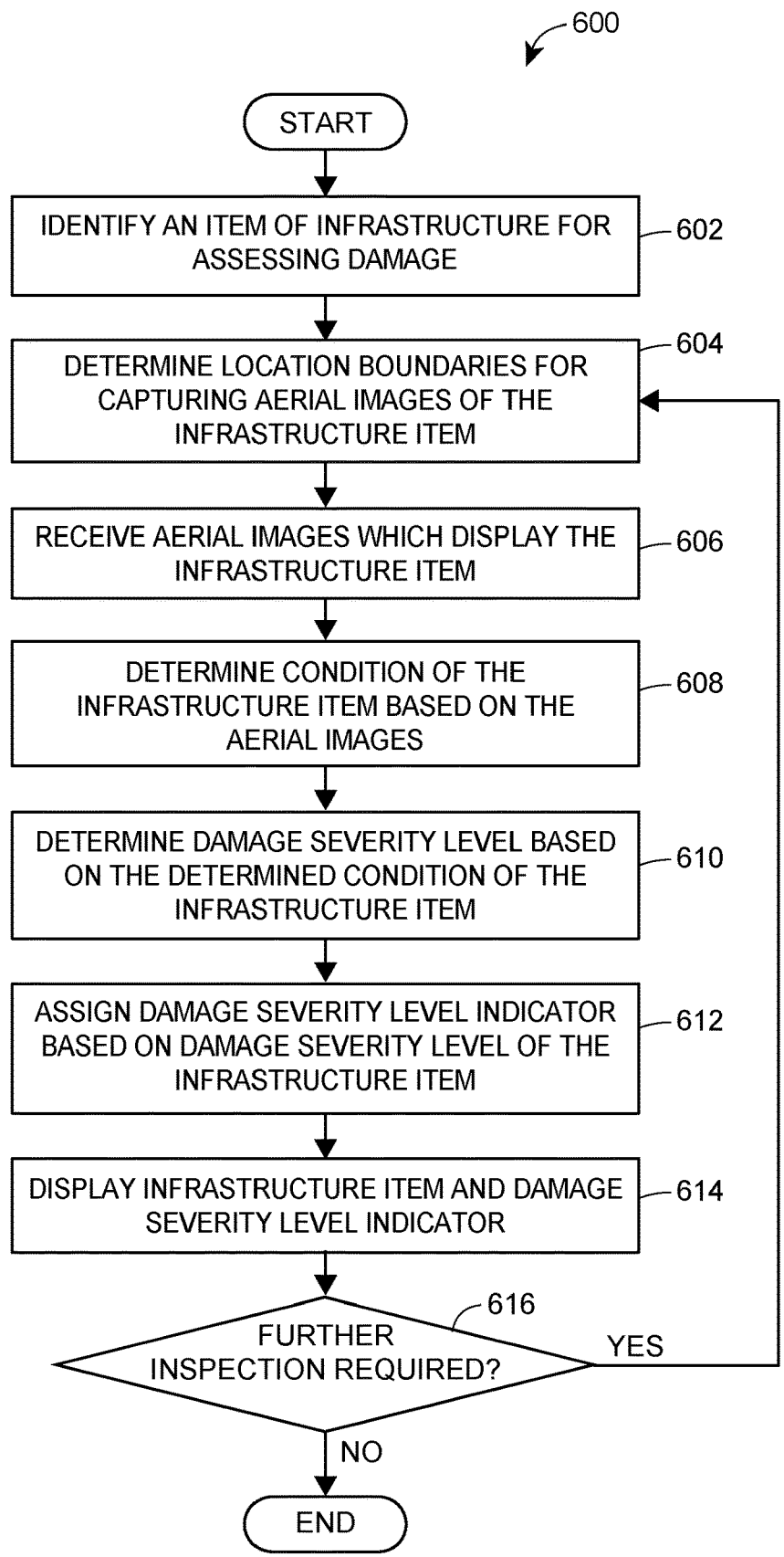
FIG. 6 illustrates a flow diagram representing an exemplary method for performing automatic damage assessment of an item of infrastructure in accordance with the presently described embodiments.

FIG. 6 illustrates a flow diagram representing an exemplary method 600 for performing an automatic damage assessment of an item of infrastructure. The method 600 may be executed on the client device 12, the server computer 14 or some combination of the client device 12 and the server computer 14. For example, at least a portion of the method 600 may be performed by the infrastructure evaluation module 72 of FIG. 1A which as mentioned above, may be disposed on the client device 12, the server computer 14 or some combination of the client device 12 and the server computer 14. In an embodiment, the infrastructure evaluation module 72 may include computer-executable instructions stored on one or more non-transitory, tangible, computer-readable storage media or devices, and the computer-executable instructions of the infrastructure evaluation module 72 may be executed to perform the method 600.

At block 602, an item of infrastructure may be identified for assessing damage. For example, the item of infrastructure may be a highway, a road, a bridge, a tunnel, a sewer treatment plant, a water treatment plant, a reservoir, an aqueduct, an electric power grid, a communications tower, a sidewalk, a paved walkway, a rail line, a waterway (e.g., locks and dams), a port facility, or a public transportation system. Then, location boundaries for capturing aerial images of the item of infrastructure may be determined (block 604). For example, the location boundaries may be GPS coordinates which encapsulate the identified item of infrastructure. The location boundaries may be determined by looking up the location of the identified infrastructure item in the location database 68.

At block 606, aerial images which display the infrastructure item may be received. The aerial images may be received from the satellite device 18, the MAV, or the UAV(s) 40 of FIG. 1A. In some embodiments, user controls may be disposed on the client device 12 which allow a user, such as an inspector, to control the UAV(s) 40 remotely and determine when and where to capture aerial images. In other embodiments, the UAV(s) 40 may be preprogrammed to capture aerial images between the specified location boundaries. Moreover, in some embodiments, the set of aerial images may be aggregated to form a 3D display of the infrastructure item. For example, the set of aerial images may be aggregated using LIDAR, stereoscopy, or photogrammetry techniques to create the 3D image.

At block 608, the infrastructure evaluation module 72 may determine the condition of the infrastructure item based on the aerial images. In some embodiments, the aerial images which depict the infrastructure item may be made up of data points and a condition may be determined for each data point, or alternatively, for each set of data points. The condition may be determined by filtering out data points which do not depict the infrastructure item and comparing the remaining data points to data depicting a previous image of the infrastructure item taken while the infrastructure item was in good condition. Additionally, the condition may be determined by comparing the remaining data points to data depicting a similar infrastructure item in good condition and identifying differences between the two.

Based on the condition of the infrastructure item, a damage severity level may be determined (block 610). For example, a damage severity level score or a damage severity level category may be determined for each of the data points depicting the infrastructure item. The damage severity level score or category may be determined for a data point based on the determined condition of a portion of the infrastructure item depicted by the data point. A damage severity level indicator may then be assigned to the infrastructure item based on the determined damage severity level (block 612). For example, data points depicting a portion of an infrastructure item having "light damage" may be assigned a green color indicator. Moreover, in some embodiments, the damage severity level indicators may overlay the aerial images of the infrastructure item on a display, for example, on the client device 12 (block 614). In addition to placing the damage severity level indicators over the aerial images of the infrastructure item, a cost estimate for repairing and/or replacing the infrastructure item may be determined. For example, the damage severity level for a particular portion of the infrastructure item may be compared with a set of rules which includes cost estimates based on the type of infrastructure item, the quality of the infrastructure item, the size of the portion of the infrastructure item, and/or the damage severity level. Cost estimates for portions of the infrastructure item may be aggregated and/or combined to determine a total cost estimate for repairing the damage to the infrastructure item.

Furthermore, as described above, in some embodiments, items of infrastructure may require further inspection, for example, when the damage severity level is "light damage." When further inspection is required (block 616), the method steps 604 to 614 may be repeated, and the infrastructure evaluation module 72 may direct the UAV(s) 40, MAV or satellite device 18 to capture additional aerial images until further inspection is no longer necessary. In other embodiments, the infrastructure evaluation module 72 may direct a person such as an inspector to go to the site and manually inspect the infrastructure item.

To display real-time (or at least near real-time) aerial images of insured properties during a catastrophe, a property display system may identify a neighborhood affected by a catastrophe and containing a large concentration of properties that are insured by the same insurance provider. For example, more than 20 percent of the properties in the neighborhood may be insured by the same insurance provider. Then an automatic inspection of the entire neighborhood may be performed by capturing real-time aerial images of the properties in the neighborhood. The automatic inspection may be performed by an unmanned aerial vehicle (UAV), or by a swarm of UAVs working together, which may be controlled by an insurance agent or by the system and flown all over the neighborhood to capture the images. Alternatively, the automatic inspection may be performed by a satellite which also captures real-time aerial images of the properties within the neighborhood. Moreover, the inspection may also be performed by a manned aerial vehicle (MAV) which captures aerial images of the properties while flying over the neighborhood. Each captured aerial image may be associated with a location, for example a GPS location, and the GPS location may be used to determine the owner of the property which is displayed in the captured aerial image.

The real-time aerial images for a particular insured property may then be transmitted to the property owner or to a user who is approved by the property owner, in the form of a web page. For example, the property owner may have a customer account with the insurance provider that is accessible using login information (e.g., a username and password). The property owner may designate authorized users, such as relatives of the property owner who can also view the particular insured property through using their own login information. In some embodiments, when the property is public property such as a public road or public school, all residents of the city may be designated as authorized users. A notification may be transmitted to the property owner and/or to the authorized users, using the property owner's and/or the authorized users' contact information (e.g., via email, a short message service (SMS) text message, an alert, a voice recording, etc.), to indicate to the property owner and/or to the authorized users that a catastrophe has occurred in the property owner's neighborhood and that real-time aerial images of the property have been generated and are accessible through the customer accounts. When the property owner and/or the authorized users log in to their customer accounts via a web-enabled device such as a computer, laptop, mobile phone, etc., a display of the real-time aerial images of the property may be provided. The display may include several images at different angles, and locations within the neighborhood. In this manner, the property owner receives a complete view of the condition of her property during a catastrophe, even when she is away from her home. Moreover, relatives or close friends of the property owner may also receive a complete view of the property, which may allow them to come to the aid of the property owner more quickly.

Additionally, during the catastrophe the automatic inspection may be performed several times at predetermined time intervals to provide property owners with constant updates of the statuses of their properties. For example, the UAV(s), MAV, or satellite may repeatedly survey the neighborhood every 30 minutes by capturing the same photographs and/or video of the neighborhood as captured previously. The updated images may then be transmitted to the property owner's web-enabled device, thereby providing owners with up-to-the-minute updates on the statuses of their properties.

Generally speaking, to display real-time (or at least near real-time) aerial images of insured properties during a catastrophe, an aerial image capturing device which may be a satellite, MAV or one or several UAV(s) is/are directed to capture images within an identified neighborhood affected by a catastrophe and having a large percentage of properties which are insured by an insurance provider. In some embodiments, the aerial image capturing device may also capture images for a neighborhood after a theft or other property damage. The aerial image capturing device may be directed by a remote control client device having user controls for determining the location and the amount of photographs or video captured. The captured aerial images may then be provided to the remote control client device or to a server computer and grouped based on their GPS locations to determine a group of aerial images which correspond to an insured property. Each group of aerial images corresponding to an insured property may be aggregated, for example using photogrammetry, stereoscopy, or LIDAR, to create a 3-dimensional (3D) image of the insured property.

The 2D or 3D image may be created at a predefined level of detail (e.g., accurate to within ten percent) and/or may be adjustable (e.g., a user or the system may be able to "zoom in" or "zoom out" of the image). Moreover, the 2D or 3D image may be divided into property components, such as a roof, a door, siding, an exterior wall, a front lawn, a backyard, an outdoor swimming pool, a fence, a tree, a deck, a patio, etc.

The server computer may then transmit a notification to the owner of the insured property, using the owner's contact information, alerting the owner that a catastrophe, theft or other damage has occurred in her neighborhood and that images of her property have been generated and are available for viewing. The notification may be an electronic notification such as an email, SMS text message or alert, and may also include a prompt or link to a login page for accessing the images. In some embodiments, authorized users may also receive the notification. When the owner or another authorized user successfully logs in to the system, the server computer may transmit a property display web page which includes real-time (or at least near real-time)

aerial images of the owner's property. The web page may include several images taken from different locations, angles and/or zoom levels and may include user controls which enable the owner or authorized user to toggle between each of the real-time aerial images of her property. Additionally, as the owner or authorized user views the real-time aerial images, the aerial image capturing device may capture new aerial images taken from the same locations, angles and zoom levels after a predetermined time interval. The new aerial images may also be transmitted to the owner or authorized user, and when the owner or authorized user refreshes the page or toggles to another image, the most recent aerial images may be displayed. In this manner, the owner or authorized user may be provided with up-to-the-minute updates on the status of the property.

For example, the Smith family may be away from their home in Florida when a hurricane strikes their neighborhood. Due to the severity of the storm, many of the Smiths' neighbors may be left without cell phone service and the Smiths may have no way of reaching their neighbors to find out about the condition of their home. However, the Smith family may be notified of the hurricane by the property display system via email, or an alert on their cell phones. One of the Smiths may then sign on to his customer account through his insurance provider and view web pages or application screens which display the status of the Smiths' home. The Smiths may also see periodic updates to the images which may calm their fears or at least allow them to avoid unexpected surprises. Moreover, viewing images of their home may allow the Smiths to make hotel or other temporary arrangements before they comes home. The images may also allow the Smith family to call repairmen and begin fixing the damage done to their house as soon as possible.

In an alternative embodiment, the aerial image capturing device may also capture aerial images for surveillance. For example, after receiving permission from a property owner, the aerial image capturing device may capture aerial images of a car or boat dealership, a department store, a restaurant, a shopping mall, a warehouse, an office building, etc. The aerial image capturing device may hover over the property and capture aerial images at predetermined time intervals (e.g. every minute, every second, etc.). Moreover, a notification may be transmitted to the owner when suspicious activity has occurred prompting the owner to log in to the system. When the owner successfully logs in, the server computer may transmit a property display web page which includes real-time (or at least near real-time) aerial images of the dealership, department store, restaurant, office building, etc. In this manner, additional surveillance may be provided from the exterior of a building. Moreover in some embodiments, the captured aerial images may be transmitted to a security company which may analyze the aerial images in addition to images from their own security cameras.

The user may launch a client application from the web-enabled device via any suitable manner, such as touch-selecting a client application icon on the display of the web-enabled device, double-clicking on the client application icon via a mouse of the web-enabled device or a trackpad of the web-enabled device. After the user launches the client application, the home screen of the client application is displayed to the user on the web-enabled device.

The home screen may include a notification alerting the user that a disaster has impacted her neighborhood or the neighborhood of a property owner who authorized the user to view the property. For example, the notification may state, "Alert: A disaster has impacted your neighborhood! Login to view images of your property." The home screen may also include an "OK" button which when selected by the user, may direct the user to a login screen. In some embodiments, the notification may be embedded over the login screen, and when the "OK" button is selected, the notification may disappear. In such an embodiment, a "Login" button may appear on the home screen.

In order to receive the notification at the client application before the user enters login information, the data storage of the web-enabled device may store application data for the client application, as described above. For example, this data may include the location of the user's property, a username or any other suitable information from which to identify the user of the web-enabled device. While the login screen may require an enhanced level of security, for example, requiring the user to enter both a username and a password, the notification may be transmitted upon verifying the identity of the user based on the stored application data. For example, the server may determine based on a comparison of the GPS location of the aerial images to location data in the location database, that an aerial image displays John Doe's home. The server may then receive application data from a web-enabled device which includes John Doe's username, and as a result, the server may transmit the notification to the web-enabled device. In other embodiments, the user remains logged in after initially logging in to the client application and the notification may be transmitted by verifying the user's login information.

Moreover, in some embodiments where the web-enabled device is a mobile smart phone, the notification may appear on the lock screen of the mobile smart phone even before the user selects the client application. Additionally, the notification may also appear again on the home screen when the user selects the client application.

Further, in yet other embodiments, the notification may be transmitted to the user via email, SMS message, an automated voice recording, etc. The server may transmit the notification by identifying contact information for the owner of the insured property. For example, contact information such as a phone number or email address may be stored in the customer database as part of a customer account for the owner. The server may then transmit the notification to a device associated with the identified phone number, or to the identified email address. In some embodiments, the owner may enter the contact information into her customer account, or contact information may be obtained when the owner takes out an insurance policy with the insurance provider. In such instances, the notification may appear again on the home screen when the user selects the client application or may not appear on the client application.

A login screen may include an area for logging in to a customer account by entering a username and a password. The login screen may also include an area for remembering the username to avoid entering the same username the next time the user logs in to the system. Once the user enters a username and password, the user may select a "Login" button. After the "Login" button is selected, the server may verify that the username and password correspond to a customer profile from the customer database. If the username and password do not correspond to a customer account, the login screen may display an error message and prompt the user to reenter a username and password. If there is a successful match, the client application may display a property display screen.

The property display screen may include the name of the property being displayed, i.e., "Your Home," the name of the aerial image being displayed or the viewpoint of the property, i.e., "Front View," and an aerial image which displays the property. The property display screen may also include "Next" and "Back" buttons which when selected allow the user to toggle between each of the aerial images which display the property. For example, the user may be John Doe and the property may be John Doe's home. In another example, when the user is authorized by the property owner to view the property owner's home, the name of the property being displayed may be, "John Doe's Home" rather than "Your Home." In some embodiments, in addition to displaying homes, the property display screen may display a business or office building owned by the user. In any event, when John Doe selects the "Next" button, an aerial image which displays a rear view of his property may be displayed and the name of the aerial image may be "Rear View." Moreover, when John selects the "Back" button, an aerial image which displays an overhead view of his property may be displayed and appropriately named "Overhead View." In some embodiments, the property display screen may include aerial images of the exterior of a commercial building for surveillance.

When the UAV 40, the MAV, or the satellite device 18 captures a new aerial image of the same property and at the same viewpoint, the property display screen may update the property display with the new aerial image. For example, if the satellite device 18 takes a new front view image of John Doe's house, the display of the "Front View" may be removed and replaced with the new aerial image.

If a user has multiple properties in a neighborhood affected by a catastrophe or in multiple neighborhoods each affected by a catastrophe, the user may toggle between the different properties. For example, the user may select the triangle button to select another property than "Your Home," such as "Your Business." When the user selects a different property name, several aerial images which display the different property may appear on the property display along with their respective names, such as a front view of John Doe's business, a rear view of John Doe's business, a side view of John Doe's business, etc. The property display may include an apartment building, a condominium, a mobile home, a house boat, a vacation home, a boat, an RV, a hotel, commercial buildings such as an office building or business, a store or a restaurant or any other real estate property which may be insured by an insurance provider and may include residences or docks/storage.

In some embodiments, the property display may further include indicators overlaying the property which indicate the extent of the damage to the property (also referred to interchangeably herein as "damage severity level indicators"). The property may be divided into property components such as a roof, a door, a window, siding, exterior walls, a lawn, a backyard, a driveway, a garage, an outdoor swimming pool, a fence, a tree, a deck, a patio, etc. A different damage severity level indicator may be assigned to each property component depending on the extent of the damage to the property component. For example, the damage severity level indicators may be a set of colors where each color represents a different damage severity level. The property display of John Doe's home may include a red roof, a green front door, yellow windows and purple siding. The color indicators may further help the user understand the extent of the damage to her property.

While the damage severity level indicators are described as the colors red, green, purple, and yellow, the indicators are not limited to those particular colors. Instead, the damage severity level indicators may include any color and also may include any other suitable representation of a damage severity level. For example, damage severity level indicators may include numbers which are placed over each property component, labels, symbols, different shading techniques, etc.

The aerial images may be received from the UAV(s) 40 by automatically directing the one or several UAV(s) 40 to fly within the set of boundaries which encapsulate the identified neighborhood. The UAV(s) 40 may also be directed to take several photographs or capture video at different locations within the neighborhood and at several angles. Moreover, the UAV(s) 40, the MAV, or the satellite device 18 may be directed to repetitively capture the same images after a predetermined time interval. For example, the UAV(s) 40, the MAV, or satellite device 18 may be directed to capture the same images every 5 minutes, every 10 minutes, every hour, every 3 hours, etc. Alternatively, after the neighborhood is identified, a remote control client 12 user such as an insurance agent may control the UAV(s) 40 remotely, through a series of user controls on the user interface 30 to cause the UAV(s) 40 to take pictures and/or video at different locations within the neighborhood and at several angles. In other embodiments, the property display generator 64 may request and/or receive aerial images of the exterior of a commercial property, which may be received from the satellite device 18 or the UAV(s) 40. The UAV(s) 40 may be automatically directed to hover over the a set of boundaries which encapsulates the commercial property. Moreover, the UAV(s) 40, the MAV or the satellite device 18 may be directed to repetitively capture the same images after a predetermined time interval (e.g., every second, every minute, every hour, etc.).

After the aerial images are captured and received for the identified neighborhood, the property display generator may filter out aerial images that do not display insured properties, and may group together all of the aerial images which display a single insured property. For example, the customer data and the location data stored in the customer database and the location database of the server, respectively, may be used to determine the locations of insured properties as well as their respective property owners. The locations of insured properties may be compared to a received aerial image which contains GPS coordinates of its data points, as described above, to determine whether the received aerial image displays an insured property. For example, if the location of an aerial image matches with one of the locations of the insured properties then the aerial image displays an insured property. If the received aerial image does not display any insured properties the aerial image may be discarded. In some embodiments, none of the aerial images displaying the neighborhood are discarded, and all of the aerial images are utilized. In any event, the property display generator may group the remaining received aerial images with other aerial images which display the same property. In some embodiments, an aerial image may display more than one property. In this instance, the aerial image may be grouped with each of the properties that the image displays.

Each group of aerial images which displays the same property may be combined. The group of aerial images may be combined to generate a 3D image of the property using 3D imaging techniques such as stereoscopy, LIDAR, or photogrammetry. The property display generator may utilize the Cartesian or GPS coordinates received with each aerial image to reconstruct a 3D image of the property using the group of aerial images captured at different locations and angles. Each group of aerial images may be combined to generate a 3D aerial image of each property including each insured property in the neighborhood. The 3D aerial image may be created at a predefined level of detail (e.g., accurate to within ten percent) and/or may be adjustable (e.g., a user or the system may be able to "zoom in" or "zoom out").

The property display generator may then identify the owner of the property displayed in the 3D aerial image or the group of aerial images by accessing the customer database and the location database. Additionally, the property display generator may also generate a web page displaying the 3D aerial image or group of aerial images, which may be transmitted to the owner upon receiving login information for a customer account.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method for surveying a property using an unmanned aerial vehicle (UAV), the method comprising:
   identifying, by one or more processors on a computing device, a commercial property for the UAV to perform surveillance;
   directing, by the one or more processors, the UAV to hover over the commercial property and capture, via an imaging device, aerial images at predetermined time intervals;
   receiving, by the one or more processors, the aerial images of the commercial property captured at the predetermined time intervals;
   determining, by the one or more processors, a damage severity level for the commercial property based on the aerial images;
   generating, by the one or more processors, a surveillance alert;
   transmitting, by the one or more processors, the surveillance alert to an electronic device associated with an authorized user associated with the commercial property; and
   upon receiving and authenticating user login information to confirm that a user of the electronic device is the authorized user associated with the commercial property, transmitting, by the one or more processors, a property display web page to the electronic device, the property display web page including a damage severity level indicator displayed overlaying the aerial images of the commercial property.

2. The method of claim 1, further comprising directing, by the one or more processors, the UAV to one or more locations for capturing the aerial images.

3. The method of claim 1, further comprising filtering, by the one or more processors, the aerial images to remove portions which do not depict the commercial property.

4. The method of claim 1, further comprising:
   aggregating, by the one or more processors, the aerial images to generate a three dimensional display of the commercial property; and
   transmitting, by the one or more processors, the three dimensional display of the commercial property to the electronic device associated with the owner of the commercial property.

5. The method of claim 1, wherein the property display web page further includes real-time aerial images of the commercial property.

6. The method of claim 5, further comprising:
   determining, by the one or more processors, a predetermined period of time for updating the property display page; and
   when the predetermined period of time has elapsed:
      receiving, at the one or more processors, one or more new real-time aerial images of the commercial property;
      updating, by the one or more processors, the property display page with the new real-time aerial images; and
      transmitting, by the one or more processors, the updated property display page to the electronic device.

7. The method of claim 1, wherein the surveillance alert includes at least one of: an email, a short message service (SMS) message, or an automated voice recording.

8. A system for surveying a property using an unmanned aerial vehicle (UAV), the system comprising:
   a communication network; and
   one or more computing devices communicatively coupled to the communication network, each of the one or more computing devices having a memory and one or more processors and at least one of the computing devices configured to:
      identify a commercial property for the UAV to perform surveillance;
      direct the UAV to hover over the commercial property and capture, via an imaging device, aerial images at predetermined time intervals;
      receive, via the communication network, the aerial images of the commercial property captured at the predetermined time intervals;
      determine a damage severity level for the commercial property based on the aerial images;
      generate a surveillance alert;
      transmit, over the communication network, the surveillance alert to an electronic device associated with an authorized user associated with the commercial property;
      upon receiving and authenticating user login information to confirm that a user of the electronic device is the authorized user associated with the commercial property, transmit, over the communication network, a property display web page to the electronic device, the property display web page including a damage severity level indicator displayed overlaying real-time aerial images of the commercial property.

9. The system of claim 8, wherein the at least one computing device is further configured to direct the UAV to one or more locations for capturing the aerial images.

10. The system of claim 8, wherein the at least one computing device is further configured to filter the aerial images to remove portions which do not depict the commercial property.

11. The system of claim 8, wherein the at least one computing device is further configured to:
aggregate the aerial images to generate a three dimensional display of the commercial property; and
transmit, over the communication network, the three dimensional display of the commercial property to the electronic device associated with the owner of the commercial property.

12. The system of claim 8, wherein the at least one computing device is further configured to:
determine a predetermined period of time for updating the property display page; and
when the predetermined period of time has elapsed:
receive one or more new real-time aerial images of the commercial property;
update the property display page with the new real-time aerial images; and
transmit, over the communication network, the updated property display page to the electronic device.

13. The system of claim 8, wherein the surveillance alert includes at least one of: an email, a short message service (SMS) message, or an automated voice recording.

14. A non-transitory computer-readable memory storing executable instructions that, when executed by one or more processors, cause the one or more processors to:
identify a commercial property for a UAV to perform surveillance;
direct the UAV to hover over the commercial property and capture, via an imaging device, aerial images at predetermined time intervals;
receive, via the communication network, the aerial images of the commercial property captured at the predetermined time intervals;
determine a damage severity level for the commercial property based on the aerial images;
generate a surveillance alert;
transmit the surveillance alert to an electronic device associated with an authorized user associated with the commercial property; and
upon receiving and authenticating user login information to confirm that a user of the electronic device is the authorized user associated with the commercial property, transmit a property display web page to the electronic device, the property display web page including a damage severity level indicator displayed overlaying the aerial images of the commercial property.

15. The non-transitory computer-readable memory of claim 14, wherein the instructions further cause the one or more processors to direct the UAV to one or more locations for capturing the aerial images.

16. The non-transitory computer-readable memory of claim 14, wherein the instructions further cause the one or more processors to filter the aerial images to remove portions which do not depict the commercial property.

17. The non-transitory computer-readable memory of claim 14, wherein the instructions further cause the one or more processors to:
aggregate the aerial images to generate a three dimensional display of the commercial property; and
transmit, over the communication network, the three dimensional display of the commercial property to the electronic device associated with the owner of the commercial property.

18. The non-transitory computer-readable memory of claim 14, wherein the property display web page further includes real-time aerial images of the commercial property.

19. The non-transitory computer-readable memory of claim 18, wherein the instructions further cause the one or more processors to:
determine a predetermined period of time for updating the property display page; and
when the predetermined period of time has elapsed:
receive one or more new real-time aerial images of the commercial property;
update the property display page with the new real-time aerial images; and
transmit, over the communication network, the updated property display page to the electronic device.

* * * * *